Patented Feb. 12, 1924.

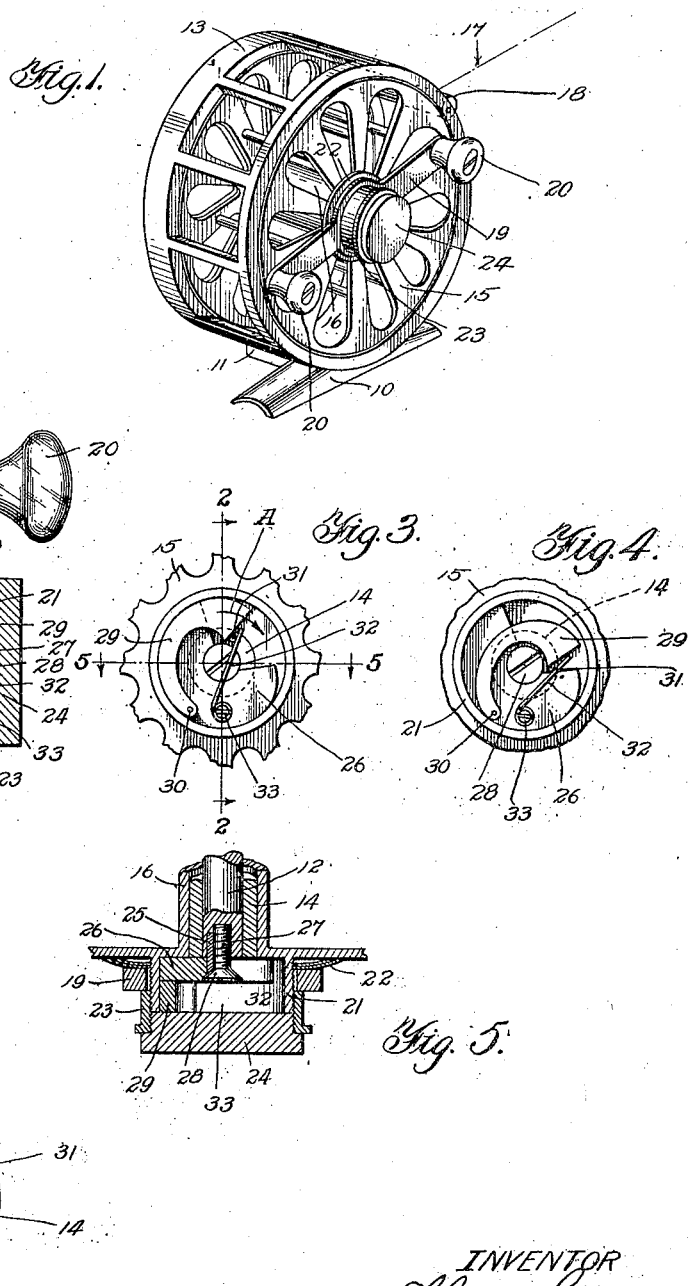

1,483,340

UNITED STATES PATENT OFFICE.

ELBERT DYER, OF BANDON, OREGON, ASSIGNOR OF ONE-FOURTH TO R. V. LEEP AND ONE-FOURTH TO L. C. EATON, BOTH OF BANDON, OREGON.

FISHING-LINE REEL.

Application filed March 3, 1923. Serial No. 622,587.

*To all whom it may concern:*

Be it known that I, ELBERT DYER, a citizen of the United States, residing at Bandon, in the county of Coos and State of Oregon, have invented certain new and useful Improvements in Fishing-Line Reels, of which the following is a specification.

My invention relates to fishing reels, and has for its primary object to provide a fishing line reel which will eliminate the slack or what is commonly known as back-lash in the line.

In a reel constructed in accordance with my invention, the anti-back-lash device or brake is confined or contained entirely within the hub of the reel, and is therefore not only concealed, but is protected from dirt or other foreign matter.

Another novel feature of construction of my improved fishing line reel resides in the provision of a cage which surrounds the reel, thereby making it impossible for the line to come off of the reel, thus eliminating the possibility of the line becoming entangled with the handle or interfering in any manner with the operation of the reel.

Another feature of my invention resides in the connection between the handle and the reel, whereby a slip connection may be provided, the tension of which may be adjusted, depending upon the strength of the fishing line and the size of the fish to be caught.

My invention further contemplates the provision of means for locking the connection between the tension adjusting means so as to eliminate the possibility of the same becoming accidentally loosened.

The novel combination, construction and arrangement of parts of my improved invention will be made more apparent as the description proceeds, especially when considered in connection with the accompanying drawings, wherein;

Figure 1 is a perspective view of a fishing reel, constructed in accordance with my invention;

Fig. 2 is an enlarged vertical section therethrough;

Fig. 3 is a fragmentary view of the interior of the hub, showing the back-lash brake;

Fig. 4 is a similar view with the brake in released position;

Fig. 5 is a fragmentary sectional view, taken substantially on the plane indicated by the line 5—5 of Fig. 3; and, Fig. 6 is a view similar to Fig. 3, certain parts being removed for the purpose of clearness.

Referring now particularly to the drawings, wherein like reference characters indicate like parts, it will be noted that the reference character 10 indicates a bracket or base which is adapted to be clamped to the fishing rod (not shown) in the usual manner. Extending upwardly from this bracket is a support 11, to which is rigidly secured the hub or axle 12 of the reel.

The reference character 13 indicates the frame or cage which is adapted to surround the reel on three sides, this cage being formed with a tubular extension 14, which surrounds the hub 12 and rotates thereon.

The reference character 15 indicates the reel which is provided with a tubular central portion 16, which surrounds the extension 14 of the cage and is adapted to rotate thereon. It is to be understood that the tubular extension 14 of the cage acts as a bearing upon which the reel rotates, while the cage 13 has a limited rotary movement upon the hub 12, as will be made more apparent hereinafter.

The fishing line 17 is carried by the reel in the usual manner, the end thereof passing through the cage 13 and over a roller 18 mounted thereon. As will be described with more particularity hereinafter, the tension of the fishing line 17, by reason of its engagement with the cage 13, through the medium of the roller 18, moves the cage to a limited extent, relatively to the hub 12 and support 11, to cause the back-lash brake to function.

For rotating the reel, there is provided a handle 19, provided with a pair of knobs 20, the handle 19 being centrally apertured so as to suround a hollow extension 21, formed on the reel 15. Arranged between the handle 19 and the reel 15 are a plurality of dished spring washers, 22.

The tubular extension or drum formed on the reel 15 is exteriorly threaded to receive a clamping cap 23, which engages the handle 19 for forcing the same toward the reel 15 against the tension of the spring washers 22. Obviously, by reason of this clamping cap the connection between the handle and the reel may be varied so that the handle will slip relatively to the reel, with a greater or less degree of pull on the line 17.

The clamping cap 23 is interiorly threaded for the reception of a jamb nut or plug 24, which engages the outer edge of the drum 21 and locks the clamping cap 23 in its adjusted position. This plug 24 also closes the open end of the drum 21 to protect the parts contained therein, which parts will be hereinafter described.

Keyed to the hub 12 by means of a longitudinally aranged key 25, is a segment-shaped member 26. Co-operating with the key 25 for rigidly connecting the segment 26 to the hub 12 is a screw 27, the tapered head 28 of which prevents a separation of the parts in an axial direction. A segment-shaped brake member, 29, is pivoted as at 30 to the segment 26, the outer surface of this brake member being adapted to engage the inner wall of the drum or extension 21 of the reel 15, as clearly illustrated in Fig. 3.

Projecting from the end of the tubular extension 14 of the cage 13, is a pin 31, which pin is adapted to engage the end of the segment-shaped brake member 29, as clearly illustrated in Figs. 3 and 4. This pin is urged in the direction in which it will engage the segment-shaped brake member 29, by means of a spring 32, which spring is coiled around a stud 33, carried by the segment 26. It is to be understood that the segment 26 is fixed rigidly to the axle 12, which does not rotate, so that a rotation of the cage 13 and tubular extension 14 in the direction of the arrow A in Fig. 3 will move the pin 32 in a similar direction against the action of the spring 32, and thus permit the segmental brake member 29 to move out of engagement with the inner surface of the drum 21 and into the position illustrated in Fig. 4. However, as soon as pressure is taken off of the cage 13, this cage moves again to its normal position, the tubular extension 14 moving in a direction opposite to that indicated by the arrow A in Fig. 3, whereupon the pin 31 again forces the segmental brake member into engagement with the drum 21 to retard the rotation of the reel 15.

The description of the operation of the reel will now be briefly related: With the reel in position upon the fishing rod, the cage 13, carrying the roller 18 will be in the position illustrated in Fig. 1, with the line 17 running loosely over this roller 18. With the cage 13 in this position the back-lash brake is in the position illustrated in Fig. 3. Should a fish then strike the hook and pull the line 17 the tension thus applied to the line will move the cage 13 relatively to the hub or axle 12, thus moving the pin 31 against the tension of the spring 32 to the position illustrated in Fig. 4, thereupon releasing the segmental brake member 29 and permitting the reel 15 to rotate freely.

If the pull exerted by the fish is a momentary pull only, the instant the tension of the line 17 is released, the cage will return to its normal position under the action of the spring 32, and the pin 31 will force the brake 29 to the position illustrated in Fig. 3, whereupon the play of the line will be retarded. Therefore, although the reel had, at the instant a tension was exerted upon the line, been permitted to rotate freely, still its rotation will be checked the instant the fish stops pulling the line, thus preventing a back-lash of the fishing line and eliminating the possibility of the line becoming entangled.

The tension on the handle 29 is adjusted by means of the nut 23, this adjustment depending upon the breaking strength of the fishing line and the size of the fish to be caught. Should the fish start to run with the line, the operator has only to grasp the handle, whereupon the reel will be permitted to unwind slowly, the pull on the line necessary to unwind the reel depending upon the amount of tension applied to the handle by the nut 23. The operator can continue to operate the handle in a manner to accomplish the winding up of the line on the reel, and at the instant the fish discontinues the pull on the line, the friction connection between the handle and the reel being sufficient, the reel will begin to wind in the line. If the fish starts to run the friction connection between the reel and handle will begin to slip and the line will play out again.

However, by continually rotating the handle to wind up the reel, the fish will be drawn in each time he releases the tension on the line, so that eventually the fish will be worn out and a safe landing of the catch may be made. In this way the line may be permitted to be drawn out or drawn in steadily, the reel, however, being held firmly and the fish having line enough only to prevent a breaking of the fishing line.

When it is desired to cast out the line, the cage 13 may be rotated slightly in the direction of the arrow A (see Fig. 3) which operates to release the segmental brake member 29 and permit the reel to rotate freely. As the casting out of the line is completed, the cage is released, whereupon it returns to its normal position, thus applying the brake and stopping the rotation of the reel.

The cage 13 which surrounds the reel on three sides thereof, prevents an unintentional disengagement of the line from the reel, which might interfere with the operation thereof. The back-lash brake mechanism is entirely contained within the tubular extension or drum 21, the open side of this drum being closed by the plug 24, thus completely protecting these parts from dirt or other foreign matter.

Obvious modifications will suggest themselves, and to this end reservation is made to make such changes in the specific form of my invention as may come within the purview of the accompanying claims.

Having thus described my invention what I claim is:

Claims:

1. In a fishing reel a bracket adapted to be supported on a fishing rod or the like, a hub carried by the said bracket, a cage mounted on said hub, provided with a central extension, a reel arranged within said cage and mounted to rotate on the central extension of said cage, a brake arranged to control the rotation of said reel and means carried by said cage for operating said brake upon a rotation of said cage.

2. In a fishing line reel a rigidly supported hub, a cage mounted for limited rotation on said hub, a reel mounted within said cage, said reel being formed with a tubular extension, a brake member arranged within said extension and engaging the same for controlling the rotation of said reel and means carried by said cage for operating said brake, when said cage is rotated.

3. In a fishing line reel a rigidly supported hub, a cage mounted on said hub and capable of a limited rotation thereon, a reel mounted within said cage and on a tubular extension of said cage, said reel being formed with a tubular extension, a segmental brake member arranged within said tubular extension and supported by said hub, means carried by said cage and engaging said segmental brake for controlling the same, said cage being moved relatively to said hub by the tension on the fishing line reel whereby said brake may be moved to released position when a pull is exerted on the fishing line.

4. In a fishing reel of the class described a bracket adapted to be secured on a fishing rod, a hub supported thereon, a cage provided with a tubular extension journalled on said hub so as to permit of a limited rotary movement, a reel journalled on said tubular extension, said reel being formed with a drum-like extension, a handle mounted on said drum-like extension, means for frictionally adjustably connecting said handle to said reel, a segmental brake member arranged within said drum-like extension and carried by said hub, a pin projecting from the tubular extension of said cage and engaging said brake member, a spring tending to normally maintain said pin in one of its extreme positions wherein said brake member is applied, said cage member being displaceable by the tension exerted on the fishing line whereupon said brake member may be released and said reel permitted to freely rotate.

In testimony whereof I affix my signature.

ELBERT DYER.